(No Model.) 10 Sheets—Sheet 1.

G. E. BLAINE.
DUMPING CAR.

No. 335,885. Patented Feb. 9, 1886.

Fig. 1.

WITNESSES
John Enders Jr.
Mary Rohrer

Geo. E. Blaine.
INVENTOR
By O. E. Duffy
Attorney (No Model.) 10 Sheets—Sheet 2.

G. E. BLAINE.
DUMPING CAR.

No. 335,885. Patented Feb. 9, 1886.

Fig. 2.

WITNESSES
John Enders Jr.
Harry Rohrer

Geo. E. Blaine.
INVENTOR
O. E. Duffy
By Attorney (No Model.)  
10 Sheets—Sheet 9.

G. E. BLAINE.
DUMPING CAR.

No. 335,885. Patented Feb. 9, 1886.

WITNESSES
John Enders Jr.
Harry Rotrer

Geo. E. Blaine.
INVENTOR
O. E. Duffy
By Attorney (No-Model.) 10 Sheets—Sheet 10.

G. E. BLAINE.
DUMPING CAR.

No. 335,885. Patented Feb. 9, 1886.

WITNESSES
John Enders Jr.
Harry Rohrer

Geo. E. Blaine,
INVENTOR
O. E. Duffy
By Attorney

UNITED STATES PATENT OFFICE.

GEORGE E. BLAINE, OF DAYTON, OHIO, ASSIGNOR TO THE BLAINE CAR AND MANUFACTURING COMPANY, OF SAME PLACE.

DUMPING-CAR.

SPECIFICATION forming part of Letters Patent No. 335,885, dated February 9, 1886.

Application filed July 25, 1885. Serial No. 172,640. (No model.)

*To all whom it may concern:*

Be it known that I, GEORGE E. BLAINE, of Dayton, in the State of Ohio, have invented certain new and useful Improvements in Dumping-Cars; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to dumping-cars, and has for its object to provide improved mechanism whereby the contents of a car may be dumped in a rapid and effectual manner with a minimum expenditure of power, a saving in time, and certainty of correct action, the parts being so arranged and combined as to be entirely under the control of the operator at any and all times, and so that their operation may be arrested or corrected at any stage.

To accomplish the objects set forth I have constructed, arranged, and combined the parts which are herein shown, and of which my invention consists, all of which I shall now proceed to fully and accurately describe, and the specific points of novelty of which I shall point out in the claims hereto appended.

Referring to the drawings herewith, and which form part thereof.

Like letters of reference indicate like parts in all the figures.

Referring to the drawings by letters, A is the body of the car, having doors A' on the sides thereof, mounted at their tops on hinges $a$, which are of ordinary construction, serving to permit the doors to swing freely when not controlled by mechanisms to be hereinafter described.

$A^2$ are the side beams or sills of the body, and $A^3$ the end beams or sills.

The body, except as hereinafter specified, is of ordinary construction.

Figure 8:
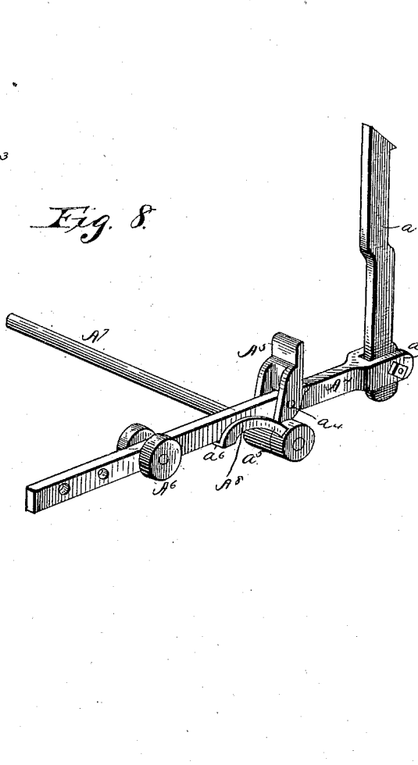
Fig. 8 is a detail perspective view of the latch mechanism.
Figure 9:
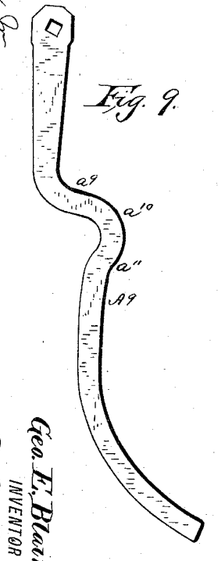
Fig. 9 is a detail view, in side elevation, of the latch-operating lever.

On the side beams, $A^2$, are clips $a'$, which serve as guides for vertical latch-bars $a^2$, of which there are two to each door, and which serve to prevent said doors from tilting or swinging outward except at the desired time. At their lower ends these latch-bars are pivoted in the forked ends $a^3$ of levers $A^4$, (see detail view, Fig. 8,) which are pivoted at $a^4$ in hangers $A^5$ depending from the sills $A^2$, and are provided with sliding weights $A^6$ on their inner ends, which normally serve to hold the latch-bars in their highest positions.

In the lower end of the hangers $A^5$, at $a^4$, are journaled rods $A^7$, near each end of which is secured an arm, $A^8$, each of which has a side projection, $a^6$, which engages under the weighted lever and serves to raise it when the rod is rotated by means of a lever, $A^9$, secured at one end to the rod and operated as hereinafter described.

B is the lower or draw frame of the car, and is composed, essentially, of two longitudinal reach-bars, B', and two bolsters, B². To this frame are attached the bumpers b b', and one end of this frame projects sufficiently beyond the end of the car to form a platform, B³, upon which the operator stands to dump the car.

To the beams or reach-bars B' are attached hanging loops or stirrups b², which serve to guide and operate automatically the levers A⁹, as hereinafter set forth.

Figures 11, 12, 13:
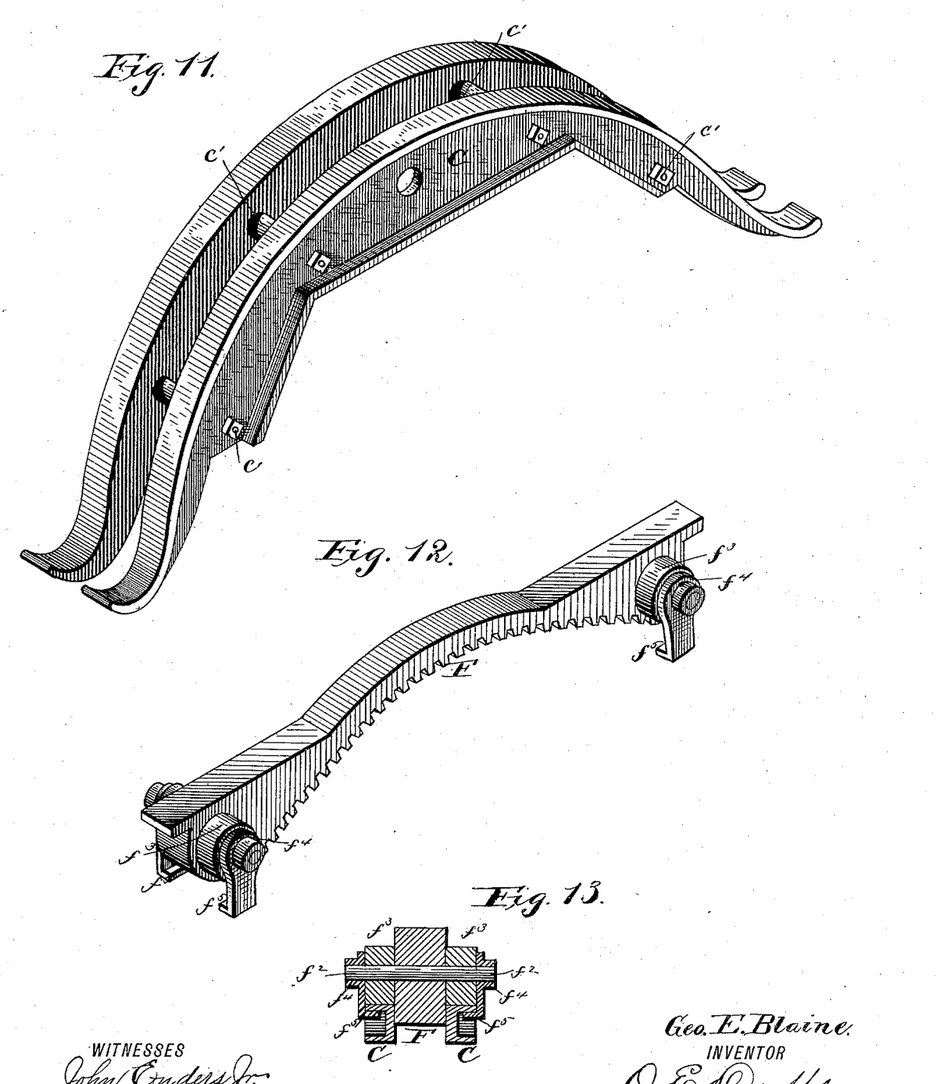
Fig. 11 is a detail perspective view of the arc-shaped guideway or sub-bolster.
Fig. 12 is a detail perspective view of the curved rack.
Fig. 13 is a detail sectional view showing the manner in which the curved rack engages the arc-shaped or curved guideway.

C are curved or arc-shaped guideways attached by means of bolts c to the projecting ends of the bolsters B² of the lower frame, and held at a proper distance apart by said bolts and shouldered cross-bolts c'. (See Fig. 11.)

Under the body A, and secured to the sills thereof, are metal bolsters or transom-bars D, to which are attached curved racks E, depending therefrom in the space between the two parts of the curved guideways before mentioned. The curved racks and curved guideways are of the same radii, so that they will always act in unison.

Figure 4:
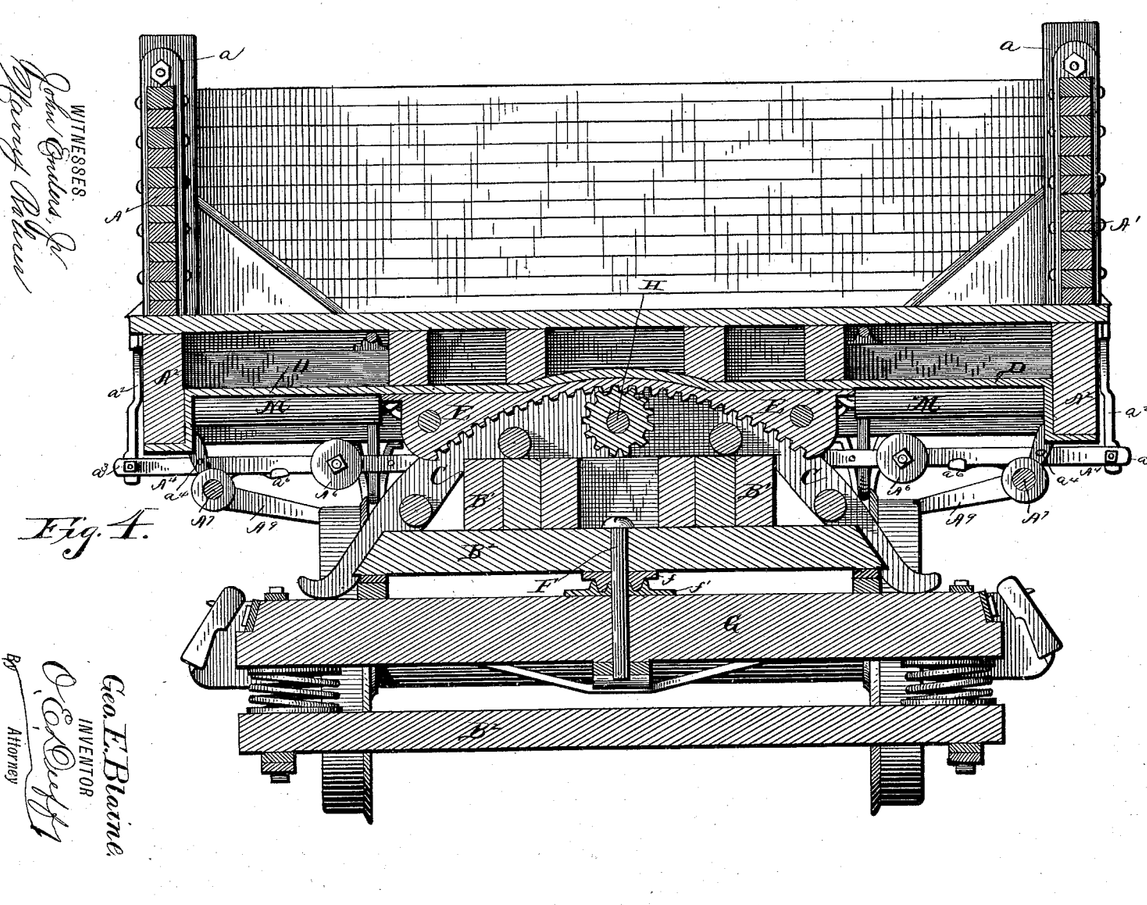
Fig. 4 is a sectional view taken on line $x\,x$ of Fig. 1, looking in the direction of the arrow, showing a rack engaging a gear on the main shaft, which extends longitudinally through the car from truck to truck.
Figure 5:
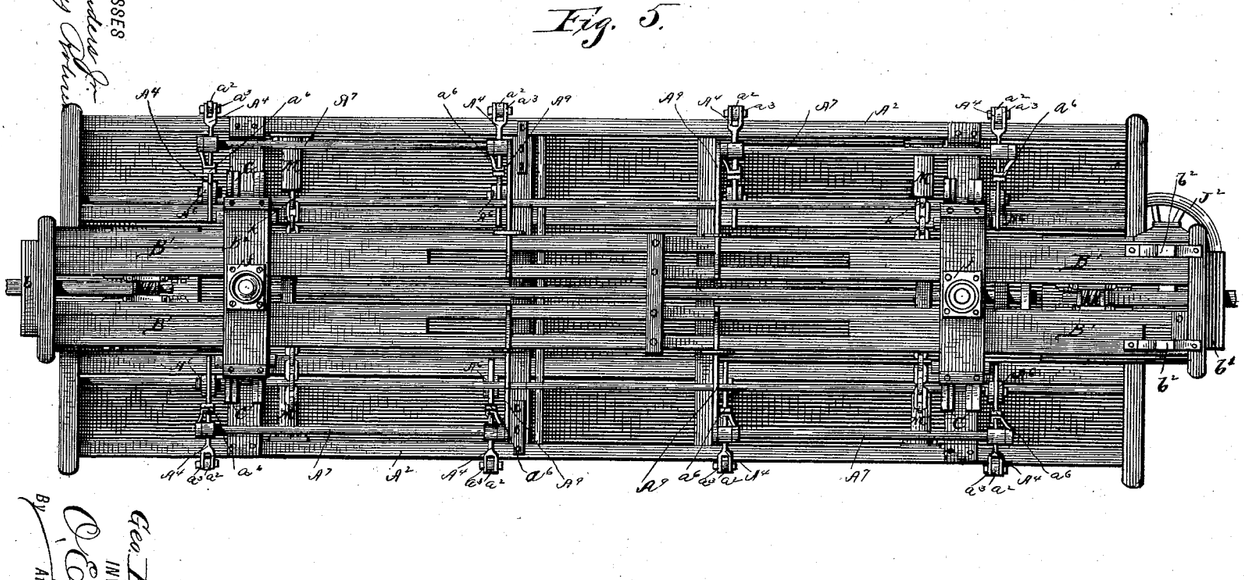
Fig. 5 is an inverted plan view of the body of the car upon the drawbody.
Figure 6:
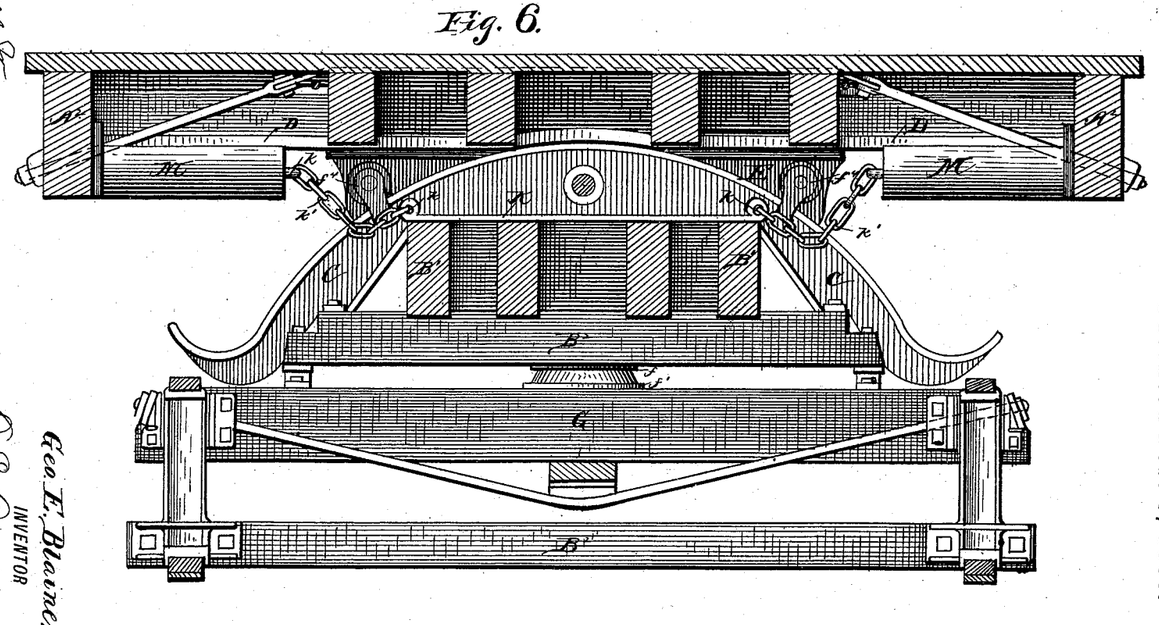
Fig. 6 is a sectional view on the line $y\,y$ of Fig. 1, looking in the direction of the arrow.

Projecting through the center of the bolster B² is the king-bolt F, by means of which the body is connected to the truck, twin pivot-bearings or guide-plates $f f'$ being secured, respectively, to the bolster and the cross-beam G of the truck, as seen in Fig. 4.

Figures 10, 14:
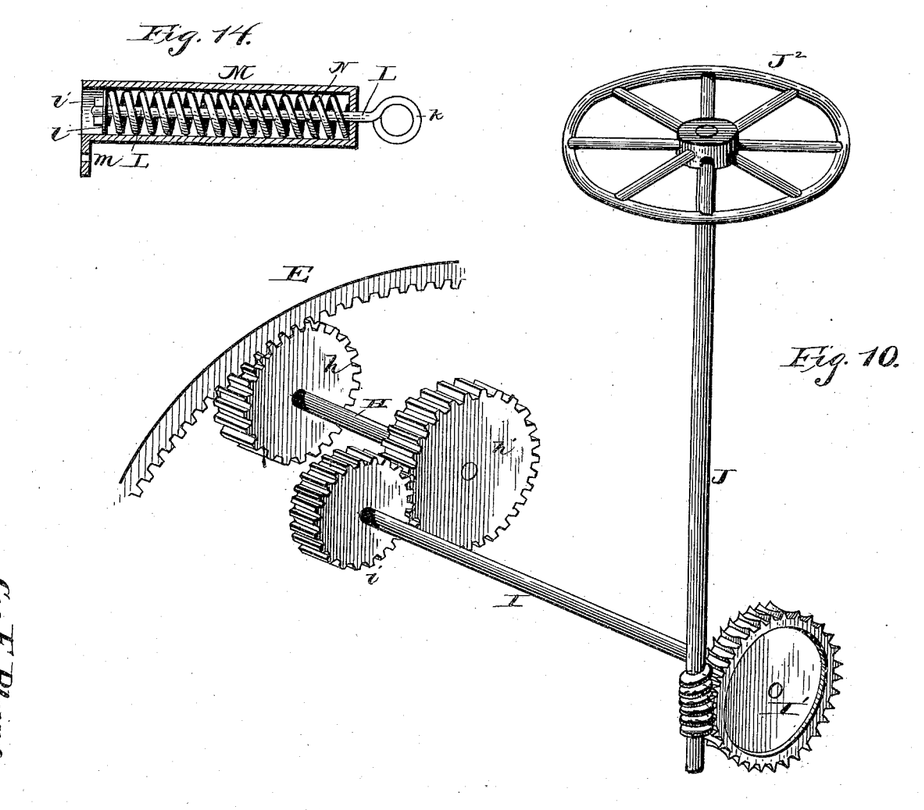
Fig. 10 is a detail perspective view of the operating devices removed from the car, consisting of the hand-wheel, its shaft, the worm mechanism, the gearing which connects it with the main shaft, and the gearing on said main shaft engaging the rack.
Fig. 14 is a detail section through one of the spring cushioning-bolts and its casing or cylinder.

The curved guides C are in pairs, one pair for each truck, the halves of each pair being, as before stated, held apart by the shouldered bolts c. In the space between them rest the curved racks, each of which is provided at each end with a pin, $f^2$, upon which is mounted, on each side of the rack, an anti-friction roller, $f^3$, which rests and moves upon the curved guide C. Outside of the roller the pin is provided on each side with a hanger, $f^4$, which drops down, and has a lateral flange or projection, $f^5$, to engage under the side of the guideways C and prevent the disengagement of the rack and the guideways. (See Fig. 13.) Engaging with each rack is a gear, h, mounted on the main operating-shaft H. (See Fig. 4.) This shaft extends from truck to truck, and through said trucks to bearings mounted upon the reach-bars B' of the lower or draw frame, B. It passes through all of the guideways C, and a gear, h, is secured upon it and situated between each pair of such guideways to engage the rack therein. The ends of these guideways are curved upward, as shown, to serve as stops or rests for the anti-friction rollers at the end of each dumping-stroke. The shaft H has upon it another gear-wheel, (marked h', see Fig. 10,) which engages a gear-wheel, i, on a short shaft, I, which, beginning at this gear-wheel, ends just above the platform B³, to which its outer bearings, i', are secured, and near its end has mounted upon it a worm-wheel, I'. Engaging this worm-wheel I' is a worm, j, mounted upon an upright shaft, J, which is journaled in a bearing, j', secured on the platform B³, and is supported by a standard, J', bolted to said platform and having a horizontal arm, through which said upright shaft passes. The shaft J terminates in a hand-wheel, J², by which it is turned and the whole train of mechanism operated, and this train of mechanism, from the hand-wheel to the curved rack, is the dumping mechanism proper, by which the whole operation of dumping may be performed. In order, however, to properly control the action and render the several parts of the device automatic, I have made the other improved devices herein set forth and shown. The lever A⁹ is provided at about its mid-length with a U-shaped downward curve, (marked $a^9 a^{10} a^{11}$,) the purpose of which will be hereinafter set forth. Near each truck, attached upon the draw-body, is a cross plate or bar, K, of metal, (see Fig. 7,) having at each end an eye, k, in which is secured one end of a chain, k', whose opposite end is secured to an eyebolt, L, which passes into a cylinder, M, through a small perforation in its end. The opposite end of the eyebolt has upon it a washer, l, and a nut, l'. A spiral spring, N, is wound around this eyebolt, resting between the washer l and the end of the cylinder through which the eyebolt passes. The cylinder M has a flange, m, on its opposite end, perforated to receive bolts m', by means of which it is secured to the sill A² of the car. These chains serve to prevent the car-body from being tilted too far in either direction, and if a sudden movement should take place the spring attachment, by means of the eyebolts, would take off all sudden jar, and by cushioning the stroke prevent breakage.

Figure 1:
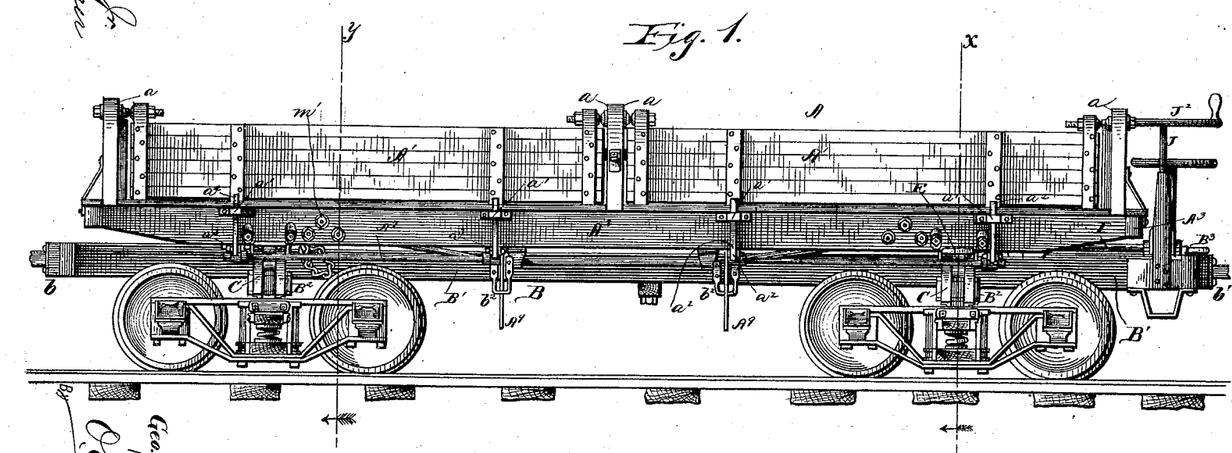
Figure 1 is a view in side elevation, showing a dumping-car containing my improvements.
Figure 2:
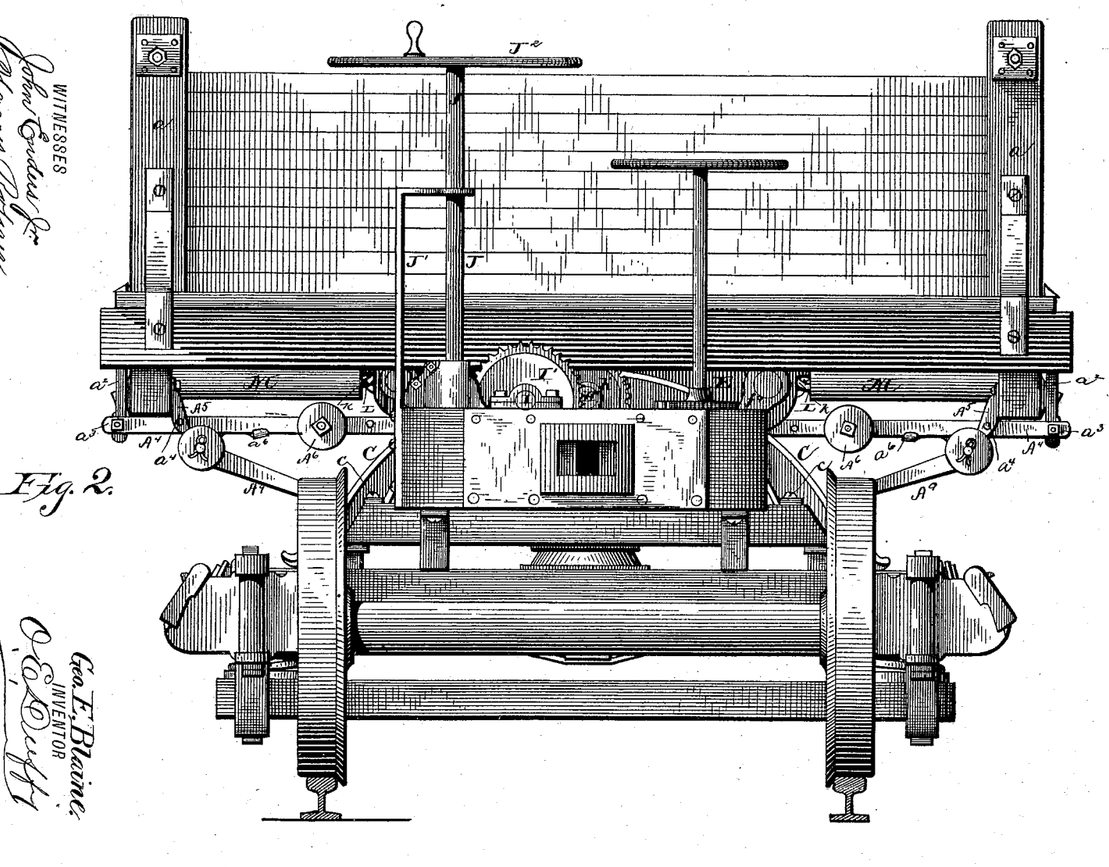
Fig. 2 is a view in elevation showing the end of the car at which the devices for operating the dumping mechanism are located, the body of the car being level, or in its running position.
Figure 3:
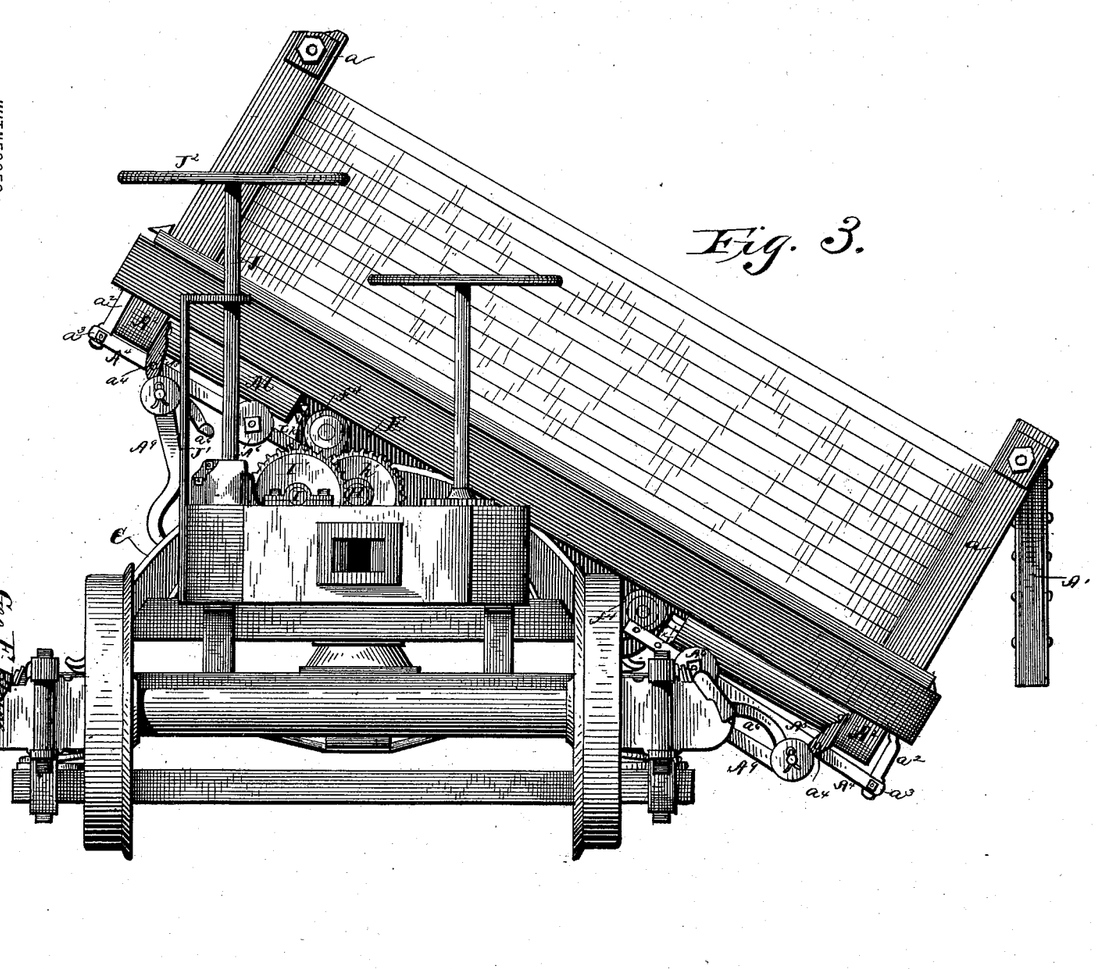
Fig. 3 is a similar elevation of the same end of the car, the body being in its right-hand inclined or dumped position.
Figure 7:
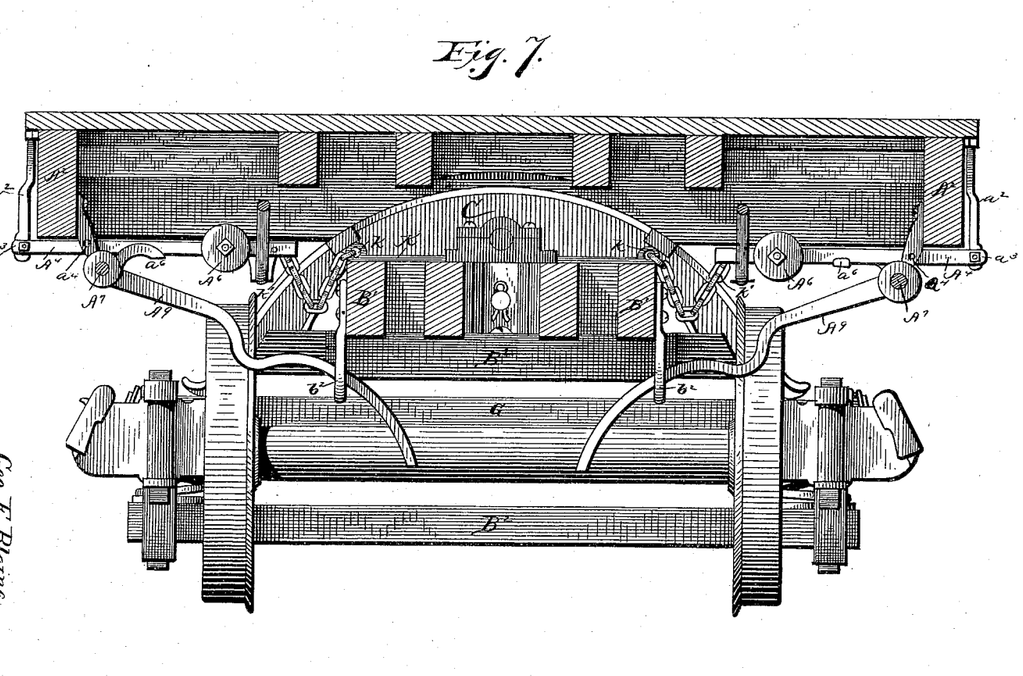
Fig. 7 is a sectional view taken on the line $z\,z$ of Fig. 1, looking in the direction of the arrow, showing the latch mechanism in elevation.

The operation of my devices may be described as follows: Supposing the car-body to be in the position shown in Figs. 1, 2, 4, or 7, and loaded, and that it is desired to bring it to the position shown in Fig. 3 to dump the load, when in the position shown in Figs. 1, 2, 4, or 7, the car-body will be level, the gear H engaging with the center of the curved rack, as shown in Fig. 4, the chains k' will be slack, as seen in Fig. 7, the latch-bars thrown to their highest position, resting outside the swinging doors, as seen in Fig. 4, and the levers A⁹ resting loosely in the stirrups b², as shown in Fig. 1. The operator, standing upon the platform B³, rotates the hand-wheel, and with it the upright shaft and its attached worm. This causes the rotation of the worm-wheel and the shaft upon which it is secured, (see Fig. 10,) thus rotating the gear-wheel on said shaft. This motion is communicated to the main shaft by the engagement of this gear-wheel with the gear-wheel on said main shaft, said shaft carrying with it in its rotation the gear-wheel h. This gear-wheel, as before stated, engages the curved rack E, and when it is revolved, being in fixed bearings, it causes the said curved rack to be moved in either direction, as the case may be, and the curved rack being fixed to the car-body, carries the car-body with it until the anti-friction rollers have reached the curved upturned ends of the curved guides, or until one of the chains $k'$ is made taut, which will occur at the end of the stroke or movement and when the car is in the position shown in Fig. 3, or in a corresponding tilted position on the other side. As before stated, this is the whole of the tilting motion proper; but I propose, further, by the mechanism hereinbefore described, to cause the latches to remove automatically out of the way of the door on the side of the car on the side to which it is being dumped at the proper time to allow the load to slide off. This is accomplished by the latch mechanism, hereinbefore described, in the following manner, viz: When the car-body begins to tilt or dump, the lever $A^9$ on the down side moves through the stirrup $b^2$ until the U-shaped bend is reached. Up to this time the latch-bars are in their normal highest position, and are held so by means of the weight on the inner end of the lever or bar $A^4$. (See Figs. 7 and 8.) The bend in the levers $A^9$ is so located that it will not reach the stirrup until just the proper time to loosen the latch and allow the load to dump. There is a double purpose in this. In the first place, if the latch was lowered too soon—that is to say, before the car had dumped sufficiently to clear itself of its load—there would be a gradual dropping of the load, or the strain or weight would not be sufficient to tilt the gate after it had been freed from the operation of the latch. As it is, however, the door is kept locked until a proper inclination of the body is reached, which is determined beforehand, and the bend in the lever $A^9$ constructed accordingly, so that when the car-body has reached such desired inclination the inclined side $a^{11}$ of the bend in the lever $A^9$ has reached the stirrup $b^2$, and, riding up on the bottom bar of said stirrup, elevates the outer end of the said lever until the summit $a^{10}$ of the bend has reached the stirrup. This is the full extent of the movement, and any further movement, should it take place, would simply allow the incline $a^9$ of the bend to ride over the stirrup and lower the latch at an undesirable time. The lowering of the latch, when the incline $a^{11}$ rides up on the stirrup, is by virtue of the fact that the raising of the outer end of the lever $A^9$ partially rotates the shaft $A^7$, carrying with it the arm $a^5$, whose bent end $a^6$ engages under the inner weighted end of the lever $A^4$, thus raising such inner end and lowering the outer end, which, by virtue of the connection at $a^3$ to the latch-bar $a^2$, draws such latch-bar down, leaving the door free to swing outward on its hinges to dump the load. When the car is fully dumped, the anti-friction rollers (as before stated) rest in the curved ends of the guideways C, and the chain $k'$ on the upper side of the car is stretched taut. A reversal of the movement of the hand-wheel by the operator reverses the motion of all the parts and brings the several parts into the level running position again. The worm and worm-wheel mechanism render the operation extremely easy, and will hold the car in any position to which it is moved, should accident or design cause the operator to cease turning it, and this result is obtained without the aid of stops or detents of any kind. When the car-body has again reached its level position, the doors will hang vertically, and may be pushed into engagement with the latches again at will, the latches being free to be pushed down at any time by simply exerting sufficient pressure to raise the weighted inner end of the lever $A^4$. The outer edge of their ends being beveled, they will be automatically lowered when the edge of the door is pressed against them, and by virtue of the weighted lever $A^4$ will rise again when the lower side of the door has passed in beyond them.

The several devices and combinations included in my improved car are possessed of many obvious advantages. As has been explained, all the actions are automatic when the hand-wheel is turned, rendering it unnecessary, as is often the case, that the operator should have assistance to enable him to dump a car. No stops are to be inserted or adjusted, no latching or unlatching of doors has to be done, except automatically, as described, and no danger of a premature dump need be feared. The weight to be dumped does not have any tendency to turn the mechanism, being effectually arrested by the worm and the worm-wheel.

A variety of changes might be made in the arrangement of the various devices herein shown without departing from the spirit of my invention. For instance, the cross-bar of the stirrup might be provided with a roller to facilitate the action of the lever-arm $A^9$. A movable or adjustable U-shaped bend might be attached to the lever $A^9$ to change the time of unlatching when desired. A spring might be used, instead of a weight, to keep the latches normally raised. The worm-wheel might be attached directly to the main operating-shaft, if desired. Many other changes in the mere arrangement of elements might be made and still come within the scope of my invention.

Having thus fully described my invention, what I claim, and desire to secure by Letters Patent of the United States, is—

1. In combination, the tilting body, the dependent concave rack carried thereby, the anti-friction rollers carried by the rack, the main or stationary body of the car, and the curved guideways mounted thereon provided with upturned ends, for the purpose set forth.

2. In combination, the tilting body, the dependent concave rack carried thereby, the pin passing through said rack, the hooked hangers on the ends of said pins, and the curved guideways having side flanges with which said hangers engage, for the purpose set forth.

3. In combination, the tilting car-body, the dependent concave rack carried thereby, the main body, a pair of curved guideways held apart by shouldered bolts, and having upturned ends and side flanges, the pins in the ends of the rack, the rollers on said pins, and the hooked hangers on said pins to engage said flanges, as set forth.

4. In combination, the tilting car-body having its sides pivoted at their tops, the latches normally held in their highest position, the operating-levers $A^9$, and the main body of the car having stirrups through which said operating-levers pass, and by which they are automatically elevated or depressed, as set forth.

5. In combination, the tilting car-body, its pivoted sides, the latches normally held in their highest position, the weighted levers secured thereto, the operating-lever $A^9$, and the main body having stirrups to operate said lever, as set forth.

6. In combination, the tilting car-body, the pivoted sides, the normally-upheld latches, the pivoted lever engaging said latches at one end and provided with adjustable weight at the other, the operating-lever $A^9$, and the main body having stirrups for actuating said lever, as set forth and described.

7. In combination, the tilting car-body, the normally-upheld latches, the operating-lever $A^9$, provided with bend $a^{10}\ a^9\ a^{11}$, and the main body having stirrups with cross-bar to operate on said bend in the operating-lever as the car-body is tilted, as set forth.

8. In combination, the tilting car-body, the flanged and perforated cylinder bolted thereto, the spring within said cylinder, the eyebolt and nut in said cylinder and engaging said spring, the main car-body, and chains connecting said main body with said eyebolts, as set forth.

In testimony that I claim the foregoing as my own I affix my signature in presence of two witnesses.

GEORGE E. BLAINE.

Witnesses:
BARRY S. MURPHY,
CHAS. D. IDDINGS.